Aug. 29, 1933.  O. STAMPFLI  1,924,383
MULTIPLE TOOL HEAD FOR DRILLING, BORING, AND LIKE MACHINE TOOLS
Filed Dec. 4, 1930  2 Sheets-Sheet 1
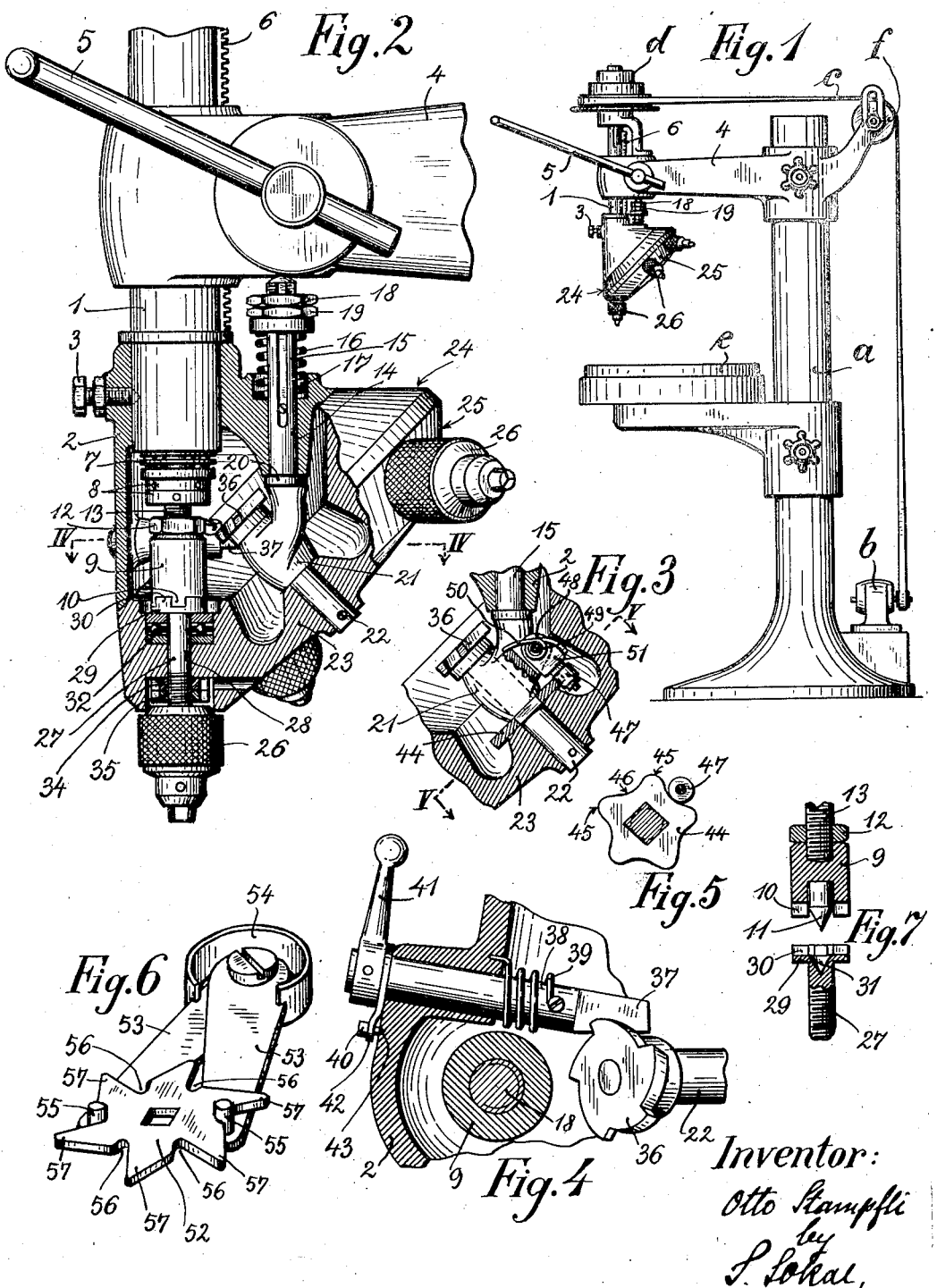
Inventor:
Otto Stampfli
by
S. Lokal,
attorney.

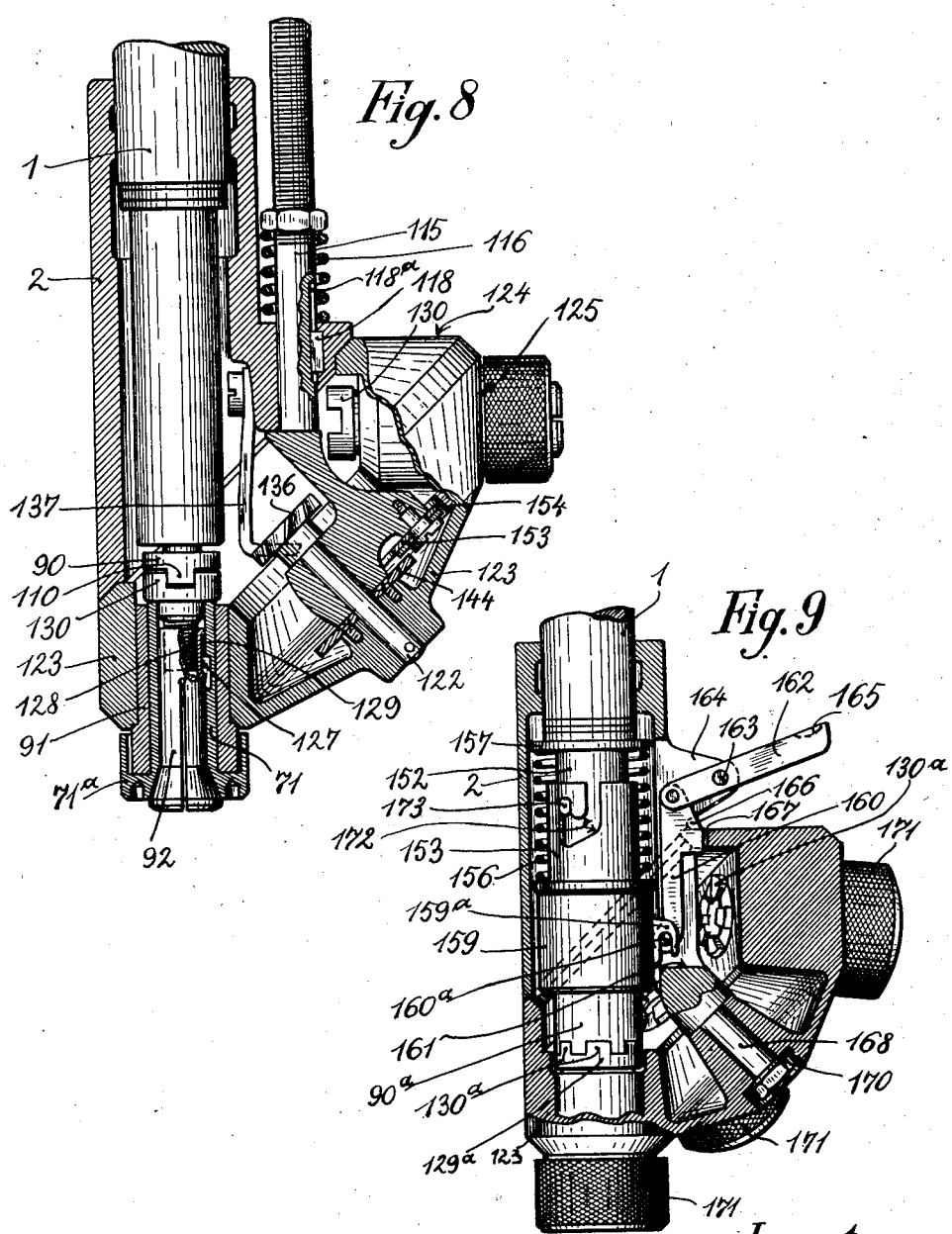

Patented Aug. 29, 1933

1,924,383

UNITED STATES PATENT OFFICE 1,924,383

MULTIPLE TOOL HEAD FOR DRILLING, BORING, AND LIKE MACHINE TOOLS

Otto Stampfli, Zug, Switzerland

Application December 4, 1930, Serial No. 500,025, and in Switzerland December 11, 1929.

9 Claims. (Cl. 77—25)

The present invention relates to multiple tool heads for drilling, boring and like machine tools, and more particularly to such multiple tool heads of the known type comprising a fixed part and a movable part carrying tool holders or chucks which movable part can be moved with regard to the fixed part in such manner that a coupling connecting the driving spindle to the tool holders is disengaged so that the next tool holder can be connected to the driving spindle after the movable part has been turned round.

The principal object of the invention is to provide a multiple tool head of the type above set forth, wherein the movable part is adapted to turn around an axis located at an angle to the axis of the driving spindle and is displaceable along an axis parallel to the axis of the said spindle in such manner that by its displacement it automatically declutches the last operating tool holder or chuck from the spindle and is automatically turned about its axis so as to bring the next tool holder into the operative position.

Some preferred constructional forms according to the invention are illustrated by way of example in the accompanying drawings, in which:

Fig. 1 is a side view of a complete drilling machine fitted with a multiple tool head according to the invention, Fig. 2 is a side view, of the multiple tool head partly in section, to an enlarged scale, Fig. 3 shows a modified constructional form of a detail, Fig. 4 is a section taken on line IV—IV of Fig. 2 to an enlarged scale, Fig. 5 is a section taken on line V—V of Fig. 3, Fig. 6 shows a further modified constructional form of the detail shown in Fig. 3, Fig. 7 shows details appertaining to Fig. 2, and Figs. 8 and 9 are side views, partly in section, of further modified constructional forms of the multiple tool head.

Referring to the drawings:

The electro-motor $b$ (Fig. 1) drives a pulley $d$ by means of a belt $c$, which is guided by a roller $f$. The reference letter $e$ denotes a work support or table which is adjustably mounted on the standard $a$ of the machine.

The fixed part 2 of the multiple tool head is fastened to the lower part of a supporting member 1 by means of a screw 3. The supporting member 1 is guided on the front part of the arm 4 of the standard $a$ in the usual way. A small pinion (not shown on the drawings) is connected with the lever 5, and meshes with a rack 6 provided on the supporting member. The latter can be moved in a vertical direction by swinging the lever 5. The driving spindle is provided with nuts 8 for the adjustment of ball bearings 7, and also with a cylindrical part 9, fitted with claws 10 and a centering pin 11 having a conical end, the said driving spindle being threaded at its lower end 13 for the attachment of the cylindrical part 9. The said cylindrical part 9, which may be called the upper half of the coupling, is fixed by means of a lock nut 12. A bore 14 is provided in the fixed part 2 of the multiple tool head. The axis of the bore 14 is parallel to the axis of the spindle. A bolt 15 is introduced into the bore 14, and a spring 16 exerts a certain pressure on the bolt 15. The spring 16 is placed between an extension 17 of the bore 14 and a nut 19, which is screwed to the upper part of the bolt and is fitted with a lock nut 18. The spring 16 has the tendency to move the bolt 15 in an upward direction. This movement is limited by the collar 20 of the bolt 15. The latter is provided at its lower end with a bearing 21 for a feed pin or bolt 22. The axis of the feed bolt 22 and the axis of the bolt 15 make an angle of 45° with one another. The rotating part 23 of the multiple tool head is fixed on the lower part of the feed bolt 22. The said rotating part is in the form of a complete wheel the periphery of which is bounded by two conical surfaces 24 and 25. The said surfaces each form an angle of 45° with the axis of the bolt. Five tool holders or chucks 26 are spaced around the lower surface so that they come into line with the spindle in their lowest positions. Each chuck is arranged on the lower part of a bolt 27, which is guided by the bore 28. A cylindrical collar 29, is provided with claws 30 and a central conical recess, is arranged on the upper part of the bolt 27. The claws 30 fit into the recesses 31 between the claws 10 and the centering pin 11. The collar 29 with the claws 30 can be referred to as the lower half of the coupling. The latter turns on a ball bearing 32, which is arranged in an extension of the bore 28. A nut 34 and lock nut 35 are arranged in a lower extension 33 of the bore 28 and prevent the bolt 27 from falling out. A ratchet wheel 36 (Fig. 4) is fitted to the head of the bolt 22. A pawl 37 provided on a bolt 38 controlled by a spring 39, is adapted to engage with the ratchet wheel. The bolt 38 is rotatably mounted in the bore of the fixed part of the multiple tool head. A pin 40 limits the rotation of the bolt 38 through the medium of a finger 42, which is fixed to the bolt and to a lever 41 and which strikes against the pin 40. The finger 42 is resilient and is provided with a conical pin 43 for the purpose of fixing the lever 41 in the two end positions. The pin 43 enters into corresponding recesses.

The multiple tool head operates in the following way. Normally the spring 16 presses the bolt 15 upwards and therefore likewise presses the whole movable part of the head against the fixed part. The two halves of the coupling 9 and 29 are in engagement so that the boring spindle is coupled to the chuck 26. Each chuck 26 preferably carries a different tool (not shown on the drawings) for instance, the chucks may carry three drills of different diameter and two reamers. After having finished the work with the first tool the lever 5 is swung upwards so that the bolt 15 strikes against the arm 4 and is pressed downwards against the pressure of the spring 16. The coupling 9, 29 is disengaged by this movement so that the spindle is disconnected. At the same time a tooth of the ratchet wheel 36 strikes against the pawl 37, as a result of which the movable part 23 makes a fifth of a turn and the next chuck is brought into position below the spindle. The bolt 15 is pressed upwards by the spring 16 and the movable part of the multiple tool head is pressed against the fixed part 2. The centering bolt 11 fits accurately into the conical recess 31, by which movement any irregularity is compensated. At the same time the coupling is coupled again and the machine is ready for a new working operation. The same procedure is repeated till all the chucks have been in the lowest position. The same sequence of operations can then be started again. By shifting the lever 41 the pawl can be disengaged and the feed can be effected by hand. A toothed or cam disc 44 may be provided for the purpose of making the travel of the feed of the bolt 15 shorter and for the purpose of enabling the movable part 23 of the multiple tool head to attain the right position immediately the said part 23 is turned. The disc 44 can be fixed between the hub 21 and the movable part 23. A roller 47 presses against the circumference of the disc, which is provided with five offsets or cams 45 and five corresponding recesses. The roller 47 is fixed to the lower end of a lever 51. A spring 50 presses against the lever 51. The lever turns around the pin 49 and is arranged between two lugs 48 provided on the hub 21.

By turning the part 23 the disc 44 is brought into operation. The corresponding offset 45 of the disc causes the lever 51 to turn against the pressure of the spring 50. As soon as the roller 47 has passed the highest point of the offset, the spring 50 presses the roller 47 with the lever 51 into the next recess, so that the last part of the turning movement of the movable part is effected automatically. The travel of the bolt can thus be shortened considerably, as it is only necessary to displace it until the roller has passed the dead point. A disc or ratchet wheel 52, as shown in Fig. 5, may be provided instead of the disc 44. The disc 52 co-operates with a claw 53. A spring 54 presses against the arms of the claw 53. Pins 55 provided on the said arms mesh with corresponding recesses 56 provided on the disc 52 between the bases of the teeth or offsets 57 of the said disc. The disc is provided with six offsets or teeth 57 and six recesses 56. The movable part 23 of the multiple tool head is likewise provided with six chucks 26 and the ratchet wheel 36 with six teeth. As soon as the part 23 turns, the coupled disc 52 moves also and the pins 55 leave their two recesses and move up to the top of the adjacent offsets 57 whilst the arms of the claw 53 are spread out against the action of the spring 54. As soon as the pins 55 have passed the top of the offsets, the spring 54 presses the pins 55 into the next recesses 56 and at the same time the disc 52 is turned together with the movable part 23 around its axis. The exact positioning of the chuck 26 with regard to the boring spindle is ensured by the action of the claws 53 in co-operation with the recesses 56, inasmuch as the pins 55 fit exactly into the recesses 56.

Figure 8 shows a modified constructional form of the multiple tool head. In this constructional form a fixed pawl 137 is employed instead of the movable pawl 37 of Figure 4, in cooperation with a ratchet wheel 136. A coupling 90, 110 connects the boring spindle with the tool holder or chuck 91, 92, 127, 128. The tool holder is provided with a sleeve 71 having a head 71a. By turning the head 71a, the tool holder 91, 92, 127, 128 is closed and the tool is clamped in the bore of the tool holder. The bolt 115 carries the bearing for the feed bolt 122. A spring 116 presses the bolt 115 upwards, whilst a key and key-way 118, 118a prevent the said bolt 115 from turning. The surfaces 124 and 125 are located at an angle of 90° to one another.

Figure 9 shows a further modified constructional form of the multiple tool head. In this case, a sleeve 153 is fitted to the lower part of the boring spindle 152, which sleeve is displaceable in the direction of the axis of the said spindle. A pin 173, which is fixed to the spindle 152, fits into a slot 172 provided on the sleeve 153, so that the spindle 152 and the sleeve 153 turn together. The lower part 90a of the sleeve carries the claws 130a and forms the upper part of the coupling. A spring 156 is provided which tends to displace the sleeve 153 downwards. The spring 156 presses against a flange 157 of the spindle 152 and a flange of the sleeve 153. A second sleeve 159 is arranged below the flange of the sleeve around the sleeve 153, said sleeve 159 being adapted to turn around the sleeve 153. A projection 159a is fixed to the sleeve 159 and is adapted to be moved up and down with the part 160. A lever 162 is arranged on a lug 164 and is fulcrumed at 163, one end of said lever 162 being fastened to the part 160. The lever 162 is provided with a recess 165. The part 160 is provided with a projection 166, which engages a recess 167 of the movable part of the head. The movable part is provided with as many recesses 167 as there are working positions of the movable part. The projection 166 and the recesses 167 fix the movable part 123 in each working position and only allow it to turn when the coupling is disengaged. The part 123 of the multiple tool head can be turned around the bolt 168, which is attached to the fixed part 2. The latter forms an angle of 45° with the axis of the boring spindle. A nut 169 and a washer keep the part 123 in position. The tool holders 171 are spaced around the movable part 123. The axle of the spindle and the axle of the tool are in alinement when the tool is in the operative position. In the interior of the tool holder 171 a cylindrical member 129a is arranged, which is fitted with claws 130a. The claws correspond with the claws of the upper part of the coupling. The sleeve 153 will be lifted by a pressure on the lever 162 against the pressure of the spring 156 and the two halves of the coupling will be separated. At the same time the projection 166 will have passed out of the recess 167 so that the part 123 of the revolving cutter head can be turned for moving the next tool into position below the spindle. As soon as there is no more pressure on the lever 162 the spring 156 moves the sleeve 153 downward and also the part 160. The halves of the coupling then come into engagement and the projection 166 enters into the corresponding recess 167.

I claim:

1. In a multiple tool head for drilling, boring and like machine tools, the combination of: a stationary member having two parallel bores; a driving spindle journalled in one of said bores; a slidable member sliding in the other one of said bores; a journal at the end of said slidable member having its axis located at an angle to the axis of said driving spindle; a movable member rotatable in said journal and participating in the sliding movement of said slidable member; a plurality of tool holders on said movable member; a dog coupling member having a conical recess on each of said tool holders; a dog coupling member on said driving spindle; a conical centering member in said last named dog coupling member adapted to engage said conical recesses; means for causing sliding movement of said slidable member parallel to said driving spindle to engage and disengage said dog coupling members; and means actuated by the sliding movement of said slidable member for automatically rotating said movable member.

2. In a multiple tool head for drilling, boring and like machine tools, the combination of: a stationary member having two parallel bores; a driving spindle journalled in one of said bores; a slidable member sliding in the other one of said bores; a journal at the end of said slidable member having its axis located at an angle to the axis of said driving spindle; a moveable member rotatable in said journal and participating in the sliding movement of said slidable member; a plurality of tool holders on said movable member; a dog coupling member having a conical recess on each of said tool holders; a dog coupling member on said driving spindle; a conical centering member in said last named dog coupling member adapted to engage said conical recesses; means for causing sliding movement of said slidable member parallel to said driving spindle to engage and disengage said dog coupling members; and a feed device actuated by said slidable member for automatically turning said movable member on its axis, whereby a new tool holder is brought into the operative position in alinement with said driving spindle.

3. In a multiple tool head for drilling, boring and like machine tools, the combination of: a stationary member having two parallel bores; a driving spindle journalled in one of said bores; a slidable member sliding in the other one of said bores; a journal at the end of said slidable member having its axis located at an angle to the axis of said driving spindle; a movable member rotatable in said journal and participating in the sliding movement of said slidable member; a plurality of tool holders on said movable member; a dog coupling member having a conical recess on each of said tool holders; a dog coupling member on said driving spindle; a conical centering member in said last named dog coupling member adapted to engage said conical recesses; means for causing sliding movement of said slidable member parallel to said driving spindle to engage and disengage said dog coupling members; a feed device actuated by said slidable member for automatically turning said movable member on its axis, whereby a new tool holder is brought into the operative position in alinement with said driving spindle; and a pawl member operating said feed device.

4. In a multiple tool head for drilling, boring and like machine tools, the combination of: a stationary member having two parallel bores; a driving spindle journalled in one of said bores; a slidable member sliding in the other one of said bores; a journal at the end of said slidable member having its axis located at an angle to the axis of said driving spindle; a movable member rotatable in said journal and participating in the sliding movement of said slidable member; a plurality of tool holders on said movable member; a dog coupling member having a conical recess on each of said tool holders; a dog coupling member on said driving spindle; a conical centering member in said last named dog coupling member adapted to engage said conical recesses; means for causing sliding movement of said slidable member parallel to said driving spindle to engage and disengage said dog coupling members; and a feed device actuated by said slidable member for automatically turning said movable member on its axis, said feed device comprising a ratchet wheel mounted on said movable member, a pawl member on said stationary member actuating said ratchet wheel, a toothed disc associated with said ratchet wheel and having recesses between the bases of its teeth, a spring controlled claw member, and pins on said claw member co-operating with said teeth and the recesses.

5. In a multiple tool head for drilling, boring and like machine tools, the combination of: a stationary member; a driving spindle journalled in said stationary member; a slidable member mounted in said stationary member laterally of said driving spindle and adapted to slide parallel to said driving spindle; a bearing on said sliding member having its axis inclined to the axis of said driving spindle; a movable member journalled in said bearing and rotatable around the axis thereof, said movable member participating in the sliding movement of said slidable member; tool holders on said movable member; a clutch member on each of said tool holders; a clutch member on said driving spindle adapted to engage any one of said clutch members on said tool holders; means for sliding said slidable member together with said movable member in a direction parallel to said driving spindle to engage and disengage said clutch members; and means positively actuated automatically by the sliding movement of said slidable member independently of the drive of said driving spindle for causing said movable member to turn on its axis.

6. In a multiple tool head for drilling, boring and like machine tools, the combination of: a stationary member; a driving spindle journalled in a bore of said stationary member; a slidable member mounted in a second bore of said stationary member and displaceable parallel to the axis of said driving spindle; a movable member journalled in said slidable member and rotatable about an axis inclined to that of said driving spindle; a plurality of tool holders on said movable member; a clutch member on each of said tool holders; a clutch member on said driving spindle adapted to engage any one of said clutch members on said tool holders; means for displacing said slidable member and said movable member in a direction parallel to the axis of said driving spindle to bring any one of said clutch members on said tool holders in and out of engagement with said clutch member on said driving spindle; and means positively actuated automatically by the displacement of said movable member independently of the drive of said driving spindle, for causing said movable member to turn around an axis which is inclined to that of the driving spindle.

7. In a multiple tool head for drilling, boring and like machine tools, the combination of: a stationary member having two parallel bores; a driving spindle journalled in one of said bores; a slidable member sliding in the other one of said bores; a journal at the end of said slidable member having its axis located at an angle to the axis of said driving spindle; a movable member rotatable in said journal and participating in the sliding movement of said slidable member; a plurality of tool holders on said movable member; a clutch member on each of said tool holders; a clutch member on said driving spindle adapted to engage any one of said clutch members on said tool holders; means for causing sliding movement of said slidable member together with said movable member in a direction parallel to the axis of said driving spindle for engaging and disengaging said clutch members; and means positively actuated automatically by the sliding movement of said slidable member independently of the drive of said driving spindle for turning said movable member around the inclined axis of said journal, whereby a new tool holder is brought into the operative position in alinement with said driving spindle.

8. In a multiple tool head for drilling, boring and like machine tools, the combination of: a stationary member having two vertical parallel bores; a vertical driving spindle journalled in one of said bores; a vertical slidable member sliding in the other one of said bores; a journal at the end of said slidable member having its axis located at an angle to the axis of said driving spindle; a movable member rotatable in said journal and participating in the sliding movement of said slidable member; a plurality of tool holders on said movable member; a clutch member on each of said tool holders; a clutch member on said driving spindle adapted to engage any one of said clutch members on said tool holders; means for causing sliding movement of said slidable member together with said movable member in a direction parallel to the axis of the driving spindle for engaging and disengaging said clutch members; and means positively actuated automatically by the sliding movement of said slidable member independently of the drive of said driving spindle for turning said movable member in said journal around an axis inclined to the axis of said driving spindle, whereby a new tool holder is brought into the operative position in alinement with said driving spindle.

9. In a multiple tool head for drilling, boring and like machine tools, the combination of: a stationary member having two parallel bores; a driving spindle journalled in one of said bores; a bolt sliding in the other one of said bores; a journal at the end of said bolt having its axis located at an angle to the axis of said driving spindle; a movable member rotatable in said journal and participating in the sliding movement of said bolt; a plurality of tool holders on said movable member; a clutch member on each of said tool holders; a clutch member on said driving spindle adapted to engage any one of said clutch members on said tool holders; means for causing sliding movement of said bolt together with said movable member in a direction parallel to the axis of said driving spindle for engaging and disengaging said clutch members; and means positively actuated independently of the drive of said driving spindle for turning said movable member around the inclined axis of said journal, whereby a new tool holder is brought into the operative position in alinement with said driving spindle.

OTTO STAMPFLI.